Oct. 12, 1926.
G. P. GREGORY
1,603,240
FLOAT VALVE FOR FEED TANKS
Filed Nov. 23, 1925
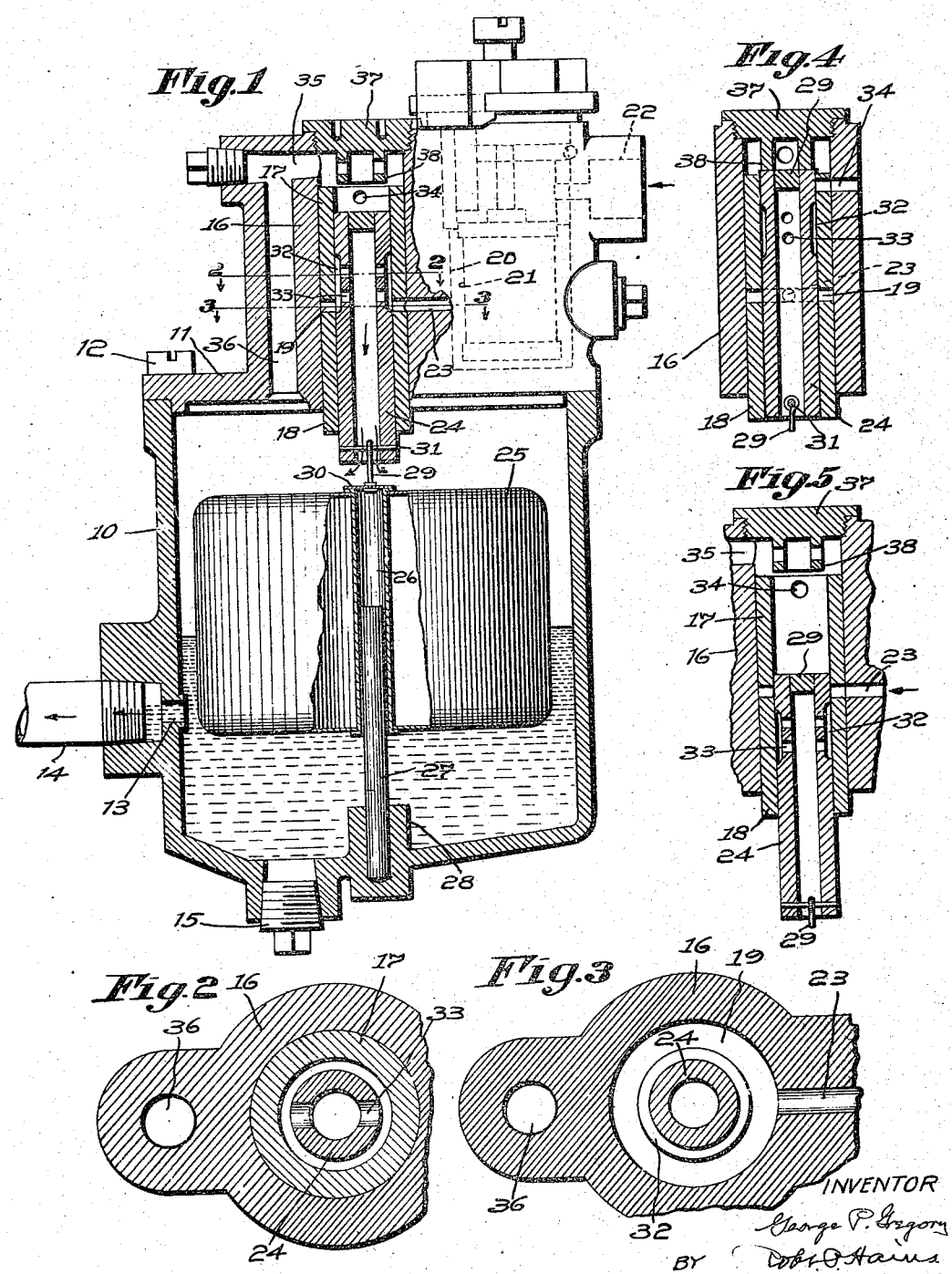
INVENTOR
George P. Gregory
BY
ATTORNEY Patented Oct. 12, 1926.

1,603,240

UNITED STATES PATENT OFFICE.

GEORGE P. GREGORY, OF PITTSFIELD, MASSACHUSETTS, ASSIGNOR TO THE BOSTON AUTO GAGE COMPANY, OF PITTSFIELD, MASSACHUSETTS, A CORPORATION OF MASSACHUSETTS.

FLOAT VALVE FOR FEED TANKS.

Application filed November 23, 1925. Serial No. 70,817.

This invention relates to float operated valves for maintaining the liquid within a tank at approximately a constant level, and altho the present device may be employed for various purposes, it is designed more particularly to regulate the feed pressure head to oil burners.

Float operated valves have been extensively used heretofore to control the level of water in a tank, but these tanks are usually provided with an overflow pipe thru which the water may escape in case it rises to an abnormal level thru failure of the float valve to operate properly.

While water tanks may be provided with overflow pipes to prevent damage by flooding when the float valve fails to operate properly, it is not practical to provide a feed tank of an oil burner with such overflow pipe.

The present invention therefore relates to a liquid tank which is closed so that the liquid cannot overflow upon rising to the top of the tank, and to valve controlled means for maintaining the liquid at approximately a constant level within the tank, and which serves also to close the tank air vent in case the tank becomes flooded and to cut off the supply of liquid to the tank in case the float becomes logged and sinks.

Other features of the invention and novel combination of parts, in addition to the above, will be hereinafter described in connection with the accompanying drawings which illustrate one good practical form of the invention.

In the drawings:—

Fig. 1 is a vertical sectional view thru a feed tank having a float operated valve constructed in accordance with the present invention.

Fig. 2 on an enlarged scale is a sectional view on the line 2—2 of Fig. 1.

Fig. 3 is a sectional view on the line 3—3 of Fig. 1.

Fig. 4 is a vertical sectional view thru the valve mechanism of Fig. 1, the view being taken at right angles to the plane of Fig. 1, and shows the valve in its uppermost position; and, Fig. 5 is a view similar to Fig. 1 but shows the valve in its lowest position and the casing broken away.

The liquid feed tank 10 may have any desired construction and is preferably provided with a tight cover 11 which may be secured to the tank by bolts 12 to prevent liquid from overflowing at the upper end of the tank in case the tank becomes flooded. The tank 10 is shown as having an outlet port 13 thru which the liquid may pass to a pipe 14 leading from the tank. The tank 10 is preferably provided with a plug 15 at the bottom of the tank thru which dirt or sediment may be drained, or in case the present device is employed to supply fuel to an oil burner; water which may accumulate in the lower portion of the casing below the oil may be removed thru the opening in the bottom of the tank.

In the construction shown the cover plate 11 is provided with an upstanding portion or casing in which a valve chamber is formed. This valve chamber may be variously constructed and is shown as having an annular wall 16 in which the bushings 17 and 18 are tightly fitted, a space 19 being provided between the upper end of the bushing 18 and lower end of the bushing 17 to admit liquid to the sliding valve to be described. It may be desirable to provide a strainer for removing dirt from the liquid before it enters the feed tank, and the upstanding portion of the cover 11 is therefore shown as provided with a receptacle 20 in which a strainer 21 of any desired construction may be mounted. The strainer, however, forms no part of the present invention and is therefore merely indicated in dotted lines.

The liquid supplied to the feed tank, in the construction shown, enters the strainer receptacle 20 thru an inlet port 22 and passes from the receptacle 20 to the valve casing thru the port 23 and annular space 19.

The flow of the liquid from the port 23 to the tank 10 is controlled by a sliding valve 24 constructed to fit in the bushings 17 and 18 and this valve is operated by a float 25 of any desired construction and positioned within the tank 10. The float 25 is shown as having a central tube 26 adapted to receive a post 27 the lower end of which is snugly fitted in a boss 28 extending upwardly from the bottom of the tank 10 and this post serves to guide the float in its vertical movement. The means shown for connecting the float 25 to the sliding valve 24 consists of a bolt 29 the lower end of which is rigidly secured to a bar 30 secured across the upper end of the tube 26. The upper end of the bolt 29 is provided with an eye thru which the cross pin 31 extends and the ends of this pin project into the side walls of the valve 24.

The sliding valve 24 is shown as having the form of a tube or hollow cylinder the outer walls of which fit snugly within the bushings 17 and 18 and the inner bore of which forms a passage thru which the liquid may pass downwardly into the float tank, as indicated by the arrows. An intermediate portion of the tubular valve 24 is reduced in diameter as at 32 and passages 33 leading from the reduced portion 32 to the central bore of the valve permit the liquid from the supply port 23 to enter the central portion of the valve thru these passages. The arrangement is such that when the valve 24 is in the position shown in Fig. 1 liquid is permitted to enter the tank from the supply port 23 and as the level of the liquid within the tank rises, the float 25 will rise to move the reduced portion 32 of the valve out of alinement with the annular space 19 to cut off the supply of liquid to the tank. Due to the construction shown a relatively slight movement of the valve 24 will serve to open or close the same and since the passage 19 permits the liquid to entirely surround the valve the valve opening is not likely to become clogged by particles of dirt or foreign matter lodging therein.

Since the feed tank 10 is tightly closed it is important that an air vent be provided for equalizing the air pressure in the tank, and in the construction shown an air vent 34 is provided in the form of a drill hole near the upper end of the valve casing and extends thru a side wall of the casing to communicate with the atmosphere.

The air which enters this vent may pass along the laterally extending passage 35 at the upper end of the valve casing, and then downward thru the passage 36 into the tank. The upper end of the valve casing is closed by a threaded nut 37 screwed into the upper face of the casing, and this nut is preferably provided with a downwardly extending boss 38 that serves to limit the movement of the valve 24 in an upward direction, as will be apparent from Fig. 4. The upper end of the tubular valve 24 is shown as closed by a plug 39, but this is not essential in all embodiments of the invention.

It is possible under some conditions that the tank 10 may become flooded; this condition may occur thru a leakage of the valve, or by liquid being forced back into the tank thru the discharge pipe 14. If this occurs it is important to prevent the liquid from escaping from the valve casing thru the vent 34. The sliding valve 24 is therefore constructed so that when the liquid in the tank 10 rises to an abnormal degree the float 25 will move the valve to its uppermost position shown in Fig. 4, whereupon it will close the air vent 34, and will also close the inlet port 23, as will be apparent from Fig. 4. In this manner liquid is prevented from escaping from the tank thru either the port 23 or the air vent 34 if the tank should become flooded.

It is possible that a leak may occur in the float 25 in which case it will become logged and will move downward until it rests upon the upper end of the lug 28. It is desirable that the valve 24 operate to cut off the supply of liquid to the tank in case the float becomes logged, and the valve is therefore constructed so that if the float moves downward to its lowermost position it will move the valve 24 downward into the position shown in Fig. 5, so that the upper end portion of the valve will lie opposite the inlet port 23 and will cut off the supply of liquid to the tank, as will be apparent from Fig. 5.

As a result of the construction above described, the float 25 will actuate its valve to maintain the liquid in the tank 10 at substantially a constant level, which will support the float in its normal position; that is the position in which the valve 24 is raised slightly from the wide open position of Fig. 1 to the partly closed position. If the float moves downward slightly from its normal position it will increase the size of the inlet opening to increase the level of the liquid in the tank; whereas if the float moves upward a slight distance it will cut off the supply of liquid to the tank until the level of the liquid therein has dropped to the normal position. Should the tank become flooded thru any cause, the rising of the liquid within the tank will serve to close the port 23 and also the air vent, to prevent liquid from escaping thru the vent, and should the float become logged and sink the valve will close the inlet port and cut off the supply of liquid to the tank until the defective condition of the float has been repaired. The construction of the parts should be such that if the valve 24 is moved to its wide open position it will admit liquid into the tank 10 more rapidly than the liquid can be drawn therefrom by the outlet pipe 14, this being necessary in order that the mechanism described may maintain the liquid at substantially a constant level within the tank.

What is claimed is:—

1. In combination with a liquid feed tank, means for maintaining the liquid therein at approximately a constant level, comprising a valve casing having a liquid inlet port and an air vent, a valve for the valve casing, a float in the tank for operating the valve to open and close the inlet port, and the valve being constructed to close the air vent upon the rising of the liquid in the tank to an abnormal degree and to close said port in case the float becomes logged and sinks.

2. In combination with a liquid feed tank, means for maintaining the liquid therein at approximately a constant level, comprising a valve casing having a liquid inlet port and an air vent, a valve for the valve casing, a float in the tank for operating the valve, and the valve being constructed to open the inlet port as the liquid falls below a normal level and to close the port as the liquid rises above the normal level and movable by the float to close the air vent in case the tank becomes flooded and movable to still another position to close the port in case the float becomes logged and sinks.

3. A device of the class described, comprising in combination, a closed tank having liquid inlet and outlet ports and an air vent, a float in the tank, a valve actuated by the float and constructed to close both the vent and inlet port when in its uppermost position, to open both the vent and port when in an intermediate position, and to close the inlet port when moved downward to its lowest position.

4. A device of the class described, comprising in combination, a closed tank having liquid inlet and outlet ports and an air vent, a float in the tank, a sliding valve controlled by said float and constructed to close the liquid inlet port when moved by the float to either end of its stroke and to open said port while in an intermediate position and further constructed to close the air vent as it is moved to one end of its stroke.

5. In combination with a liquid feed tank, a valve casing having an outlet in communication with the tank and having an inlet port and an air vent, a valve within the valve casing, a float within the tank and operatively connected to the valve, the valve and valve casing being constructed so that the port is opened when the float occupies an intermediate position but is closed by a substantial movement of the float in either direction from its intermediate position, and the valve being further constructed to close the air vent as the float approaches one end of its path of travel.

6. In combination with a liquid feed tank, a valve casing having an outlet in communication with the tank and having an inlet port and an air vent for admitting air to the tank, a valve within the valve casing, a float within the tank for operating the valve to open the port as the liquid falls below the normal level and for closing the port as the liquid rises above this level, and the valve being constructed to close said port upon a substantial drop of the float from its lowermost position in its normal operation and to close said vent by a substantial rise of the float above its uppermost position in its normal operation.

7. In combination with a liquid feed tank, means for maintaining the liquid therein at approximately a constant level, comprising a valve casing having an inlet port and an air vent, a valve within the valve casing, a float in the tank for operating the valve to open the port as the liquid falls below the normal level and for closing the port as the liquid rises above this level, said valve being constructed to close the port upon a substantial movement of the float in either direction from its normal position and to close the air vent upon a farther movement in one direction.

8. In combination with a liquid feed tank, means for maintaining the liquid therein at approximately a constant level, comprising a cylindrical valve chamber having an inlet port in a side wall and an air vent above the port, a hollow piston valve within the valve casing and having its wall apertured at a point between its ends for the passage of liquid therethru from the port and downward within the hollow piston to the tank, a float in the tank for actuating the valve to open the port when the liquid falls below the normal level and to close the port when the liquid rises above the normal level and operable to close the air vent when the liquid in the tank rises an excessive amount.

9. In a device of the class described, in combination, a closed liquid feed tank having an outlet port, a valve casing having an inlet port for admitting liquid to the tank and an air vent for admitting air to the tank, a valve for the valve chamber, a float in the tank for operating the valve to open the port as the liquid falls below the normal level and to close the port as the liquid rises above this level and operable to close the vent in case the tank becomes flooded.

10. In a device of the class described, in combination, a closed liquid feed tank having an outlet port, a valve casing having an inlet port for admitting liquid to the tank and an air vent for admitting air to the tank, a valve for the valve casing, a float in the tank for operating the valve to open the port as the liquid falls below the normal level and to close the port as the liquid rises above this level, and the valve being constructed to close the vent in case the tank becomes flooded and to close the inlet port in case the float becomes logged and sinks.

In testimony whereof, I have signed my name to this specification.

GEORGE P. GREGORY.